(12) United States Patent
Qu et al.

(10) Patent No.: US 12,517,558 B2
(45) Date of Patent: Jan. 6, 2026

(54) FOLDABLE TERMINAL DEVICE WITH MULTIPLE DISPLAY SCREENS

(71) Applicant: Beijing Xiaomi Mobile Software Co., Ltd., Beijing (CN)

(72) Inventors: Tongxun Qu, Beijing (CN); Yuwen Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 711 days.

(21) Appl. No.: 17/823,431

(22) Filed: Aug. 30, 2022

(65) Prior Publication Data
US 2023/0384841 A1   Nov. 30, 2023

(30) Foreign Application Priority Data

May 31, 2022   (CN) .......................... 202210612996.6

(51) Int. Cl.
*G06F 1/16*   (2006.01)
(52) U.S. Cl.
CPC .......... *G06F 1/1683* (2013.01); *G06F 1/1652* (2013.01); *G06F 1/1692* (2013.01); *G06F 1/1688* (2013.01)
(58) Field of Classification Search
CPC ............. H10K 2102/311; G06F 1/1652; G06F 1/1641; G06F 1/1616; G06F 1/1683; G06F 2203/04102; G06F 1/1688; G06F 1/1692
See application file for complete search history.

(56) References Cited

U.S. PATENT DOCUMENTS

| | | | | |
|---|---|---|---|---|
| 9,497,697 | B2 * | 11/2016 | Becze | H04N 21/4316 |
| 2016/0179236 | A1 * | 6/2016 | Shin | H04M 1/0216 |
| | | | | 345/173 |
| 2019/0258295 | A1 * | 8/2019 | Fujimoto | G09F 9/00 |
| 2019/0387649 | A1 | 12/2019 | Hong | |
| 2022/0122514 | A1 * | 4/2022 | Kwon | G06F 3/1446 |
| 2022/0155826 | A1 * | 5/2022 | An | H04M 1/0268 |
| 2023/0048823 | A1 * | 2/2023 | Cho | H04M 1/0216 |
| 2023/0080404 | A1 | 3/2023 | Cui et al. | |
| 2024/0187506 | A1 * | 6/2024 | Yan | G06F 1/1677 |
| 2024/0363046 | A1 * | 10/2024 | Tian | G06F 3/0481 |
| 2025/0123864 | A1 * | 4/2025 | Min | H04M 1/0243 |

FOREIGN PATENT DOCUMENTS

| | | |
|---|---|---|
| EP | 3951553 A1 | 2/2022 |
| WO | 2022089038 A1 | 5/2022 |

* cited by examiner

*Primary Examiner* — Allahyar Kasraian
(74) *Attorney, Agent, or Firm* — McCoy Russell LLP

(57) ABSTRACT

A terminal device which includes a first main body, a first display screen, a first screen assembly, a second display screen and a second screen assembly; in a first direction, the first display screen and the second display screen are located on two opposite sides of the first main body; and both the first screen assembly and the second screen assembly are located in the first main body, a target surface of the first screen assembly and a target surface of the second screen assembly are arranged in stack, the first screen assembly is configured to realize a screen function of the first display screen, the second screen assembly is configured to realize a screen function of the second display screen, and electronic devices are mounted on the target surfaces.

19 Claims, 4 Drawing Sheets

FOLDABLE TERMINAL DEVICE WITH MULTIPLE DISPLAY SCREENS

CROSS-REFERENCE TO RELATED APPLICATION

The present application claims priority to Chinese Patent Application No. 202210612996.6, filed on May 31, 2022. The entire contents of the above-listed application are hereby incorporated by reference for all purposes.

BACKGROUND

In recent years, with development of a flexible screen technology, a terminal device in a folding form gradually appears in the public eye, and a folding mobile phone is the most common. The folding mobile phone has advantages that a size of a current mobile phone screen can be expanded, a visual display effect can be improved, use experience can be enriched, and application to wider scenarios is facilitated.

For a demand of folding, a large-size spindle system is usually arranged in a whole machine of the folding mobile phone. Besides, a mobile phone in an inside folding form is usually further provided with an auxiliary display screen besides a main display screen so as to display when the main display screen is folded, so some devices of the auxiliary screen need to be further arranged in the whole machine correspondingly. In the related art, devices of the main screen and the devices of the auxiliary screen are configured to realize screen functions of corresponding display screens, for example, driving the screens to display, a touch function and the like.

However, in the related art, the devices of the main screen and the devices of the auxiliary screen have a large demand for a space.

SUMMARY

The present application relates to the technical field of electronic devices, in particular to a terminal device.

The present application adopts the following technical solution specifically.

An example of the present application provides a terminal device. The terminal device includes a first main body, a first display screen, a first screen assembly, a second display screen and a second screen assembly;
in a first direction, the first display screen and the second display screen are located on two opposite sides of the first main body; and
both the first screen assembly and the second screen assembly are located in the first main body, a target surface of the first screen assembly and a target surface of the second screen assembly are arranged in stack, the first screen assembly is configured to realize a screen function of the first display screen, the second screen assembly is configured to realize a screen function of the second display screen, and electronic devices are mounted on the target surfaces.

BRIEF DESCRIPTION OF THE DRAWINGS

In order to describe a technical solution in the example of the present application more clearly, accompanying drawings needed in the description of the examples will be briefly introduced below, apparently, the accompanying drawings in the following description are merely some examples of the present application, and those ordinarily skilled in the art can obtain other drawings according to these accompanying drawings without creative work.

Figure 1:
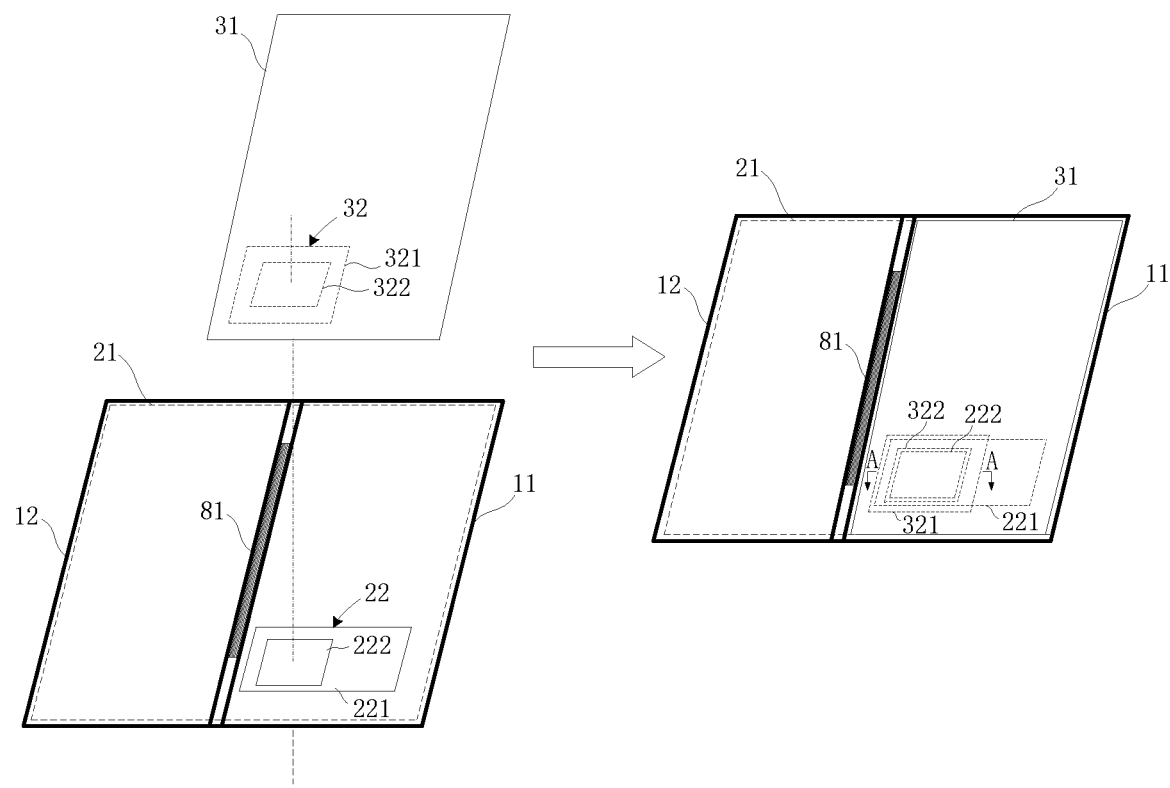
FIG. 1 is a schematic diagram of a first structure of a terminal device provided by an example of the present application.

Through the above accompanying drawings, the particular example of the present application is shown, and a more detailed description is as follows. These accompanying drawings and text description intend to describe a concept of the present application for those skilled in the art with reference to the specific example instead of limiting, by any means, the scope of the conception of the present application.

REFERENCE NUMBERS

11, first main body;
12, second main body;
21, first display screen;
22, first screen assembly;
221, first screen circuit board;
222, first screen device;
31, second display screen;
32, second screen assembly;
321, second screen circuit board;
322, second screen device;
41, first battery;
42, second battery;
51, first circuit board;
52, second circuit board;
53, third circuit board;
61, first connector assembly;
62, second connector assembly;
71, first flexible board;
711, first secondary flexible board;
712, second secondary flexible board;
72, second flexible board;
73, third flexible board;
81, spindle unit; and
91, speaker.

DETAILED DESCRIPTION

The technical solution in the example of the present application will be described clearly and completely with reference to the accompanying drawings in the example of the present application, and apparently, the described example is only a part of but not all examples of the present application. Based on the example in the present application, all other examples obtained by those ordinarily skilled in the art without creative work fall within the protection scope of the present application.

With development of economy and technology, a demand of a user for a terminal device such as mobile phone is increasingly enriched and diversified. In order to meet the demand of the user for the terminal device such as the mobile phone in different scenarios, all manufacturers have developed a double-screen mobile phone, and with development of a flexible screen technology, a double-screen terminal device is further developed, a terminal device in a folding form gradually appears in the public eye. A folding-type terminal device, for example, a folding mobile phone, has advantages that a size of a current mobile phone screen can be expanded, a visual display effect can be improved, use experience can be enriched, and application to wider scenarios is facilitated.

For a demand of folding, a large-size spindle system is usually arranged in a whole machine of the folding mobile phone. Besides, a mobile phone in an inside folding form is usually further provided with an auxiliary display screen besides a main display screen so as to display when the main display screen is folded, so some devices of the auxiliary screen need to be further arranged in the whole machine correspondingly.

However, the devices of the main screen and the devices of the auxiliary screen are usually tiled in a machine body, which has a large demand for a space, and in order to guarantee a battery capacity, the whole machine is usually designed thicker and heavier.

Figure 2:
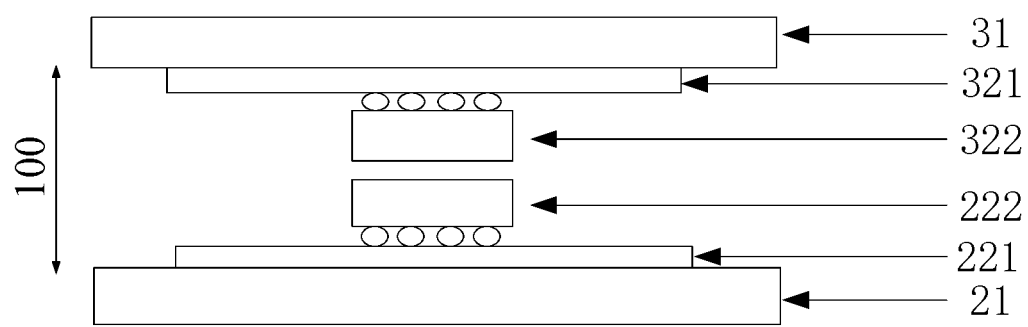
FIG. 2 is a sectional view along A-A in FIG. 1.

An example of the present application provides a terminal device, as shown in FIGS. 1 and 2, the terminal device includes a first main body 11, a first display screen 21, a first screen device 222, a second display screen 31 and a second screen device 322. In a first direction 100, the first display screen 21 and the second display screen 31 are located on two opposite sides of the first main body 11, both a first screen assembly 22 and a second screen assembly 32 are located in the first main body 11, and a target surface of the first screen assembly 22 and a target surface of the second screen assembly 32 are arranged in stack. The first screen assembly 22 is configured to realize a screen function of the first display screen 21, the second screen assembly 32 is configured to realize a screen function of the second display screen 31, and electronic devices are mounted on the target surfaces.

It should be understood that the expression "one element/structure/device is on/below/in front of/behind/on the side of another element/structure/device" should be construed in a broad sense, for example, the one element may by directly disposed on/below/in front of/behind/on the side of the another element or indirectly disposed on/below/in front of/behind/on the side of the another element through an Intermediate element, and the two elements may be in contact, connected or integrated.

In the terminal device provided by the example of the present application, the target surface, configured to mount the electronic devices, of the first screen assembly 22 of the first display screen 21 and the target surface, configured to mount the electronic devices, of the second screen assembly 32 of the second display screen 32 are arranged in stack, so compared with an arrangement mode that devices of the two display screens are all tiled in a shell in the related art, a stack arrangement mode in the present application can save a tiled area of the machine body, and the saved area can be used for improving battery capacity or arranging other devices, which is conducive to realizing a light and thin design of the machine body of the whole machine.

In the example of the present application, "first main body 11" refers to a main body structure of the terminal device and includes a shell structure such as a middle frame and a cover plate, also includes electronic devices such as a camera module, an antenna module and a sensor, and may further include other composition structures and devices of the terminal device, which can be determined according to an actual design demand of the terminal device.

In the example of the present application, the terminal device is a double-screen terminal device and includes the first display screen 21 and the second display screen 31. The two display screens are mounted on the first main body 11 and located on the two opposite sides of the first main body 11 in the first direction, and the first direction may be, for example, a thickness direction of the first main body. Under normal circumstances, as for the double-screen terminal device, one display screen is a main screen, the other display screen is an auxiliary screen, and the main screen and the auxiliary screen each have screen devices. For example, in the example of the present application, the first display screen 21 may be defined as the main screen, so the first screen assembly 22 is a main screen device, and the second display screen 31 may be defined as the auxiliary screen, so the second screen assembly 32 is an auxiliary screen device.

It needs to be noted that the first screen assembly 22 and the second screen assembly 32 are devices configured to realize screen functions of the display screens corresponding to them. In the example of the present application, the screen function refers to a function related to a screen or realized depending on the screen, for example, a display function, a screen touch function, a screen unlocking function and the like.

The target surface of the first screen assembly 22 and the target surface of the second screen assembly 32 are arranged in stack (may be also called "overlapped"), so that an occupied tiled area of the machine body is small, and "tiled" refers to laying on a length-width plane of the machine body. The saved tiled area may be used for improving a battery capacity or arranging other devices, which is conducive to realizing a light and thin design of the whole machine.

It needs to be noted that "the target surface of the first screen assembly 22 and the target surface of the second screen assembly 32 are arranged in stack" refers to that the target surface of the first screen assembly 22 and the target surface of the second screen assembly 32 are arranged in sequence in a certain direction (namely, a stacking direction), which is not limited to that the target surface of the first screen assembly 22 has to directly face the target surface of the second screen assembly 32.

Actually, the target surface of the first screen assembly 22 may directly face the target surface of the second screen assembly 32, at the moment, a first projection of the target surface of one screen assembly among the first screen assembly 22 and the second screen assembly 32 in the stacking direction is located in a second projection of the target surface of the other screen assembly in the stacking direction. Or, the target surface of the first screen assembly 22 may also correspond to merely a part of the target surface of the second screen assembly 32, and at the moment, the first projection and the second projection merely have an overlapping region partially. Or, the target surface of the first screen assembly 22 may not correspond to the target surface of the second screen assembly 32 at all, and at the moment, a gap remains between the first projection and the second projection.

It needs to be noted that "a tiled area occupied by the first screen assembly 22 and the second screen assembly 32 on the first main body 11" refers to an area occupied by the first screen assembly 22 and the second screen assembly 32 when the first screen assembly 22 and the second screen assembly 32 are directly mounted on the first main body 11. The first screen assembly 22 and the second screen assembly 32 are stacked, so though the both do not directly face each other, an effect of reducing the occupied tiled area will be caused by stacking.

In some examples of the present application, the target surface of the first screen assembly 22 and the target surface of the second screen assembly 32 may be arranged in stack in the first direction.

As for an independent screen assembly, all of its composition parts may also be stacked in a direction parallel to the stacking direction of the two target surfaces. For example, referring to FIG. 2, the first screen assembly 22 includes a first screen circuit board 221 and a first screen device 222, the first screen device 222 is connected to a device surface of the first screen circuit board 221; and the second screen assembly 32 includes a second screen circuit board 321 and a second screen device 322, the second screen device 322 is connected to a device surface of the second screen circuit board 321, and the device surface of the first screen circuit board 221 and the device surface of the second screen circuit board 321 are arranged in stack. The above screen circuit board may be, for example, a printed circuit board (PCB), PCB may include a device surface and a welding surface, the device surface is used for mounting devices and usually have prints of a device figure, a character and other marks, and the welding surface is used for welding device pins and usually has no print of any mark. In the example of the present application, as for each independent screen assembly, the screen device may be connected to the device surface of the corresponding screen circuit board, so that stacking of all composition parts of the screen assembly is realized, and the tiled area occupied by each screen assembly is reduced. Furthermore, a surface where the device surface of the first screen circuit board 221 is located may be used as the target surface of the first screen assembly 22, a surface where the device surface of the second screen circuit board 321 is located may be used as the target surface of the second screen assembly 32, by stacking the two device surfaces, stacking of the two target surfaces is realized, and thus the tiled area occupied by the first screen assembly 22 and the second screen assembly 32 on the first main body 11 is further reduced.

The "screen device" refers to a device which is related to the screen in function or realizes a function depending on the screen, for example, a display driver IC (Integrated Circuit) and a screen touch IC (Integrated Circuit), and the like.

In some examples of the present application, as shown in FIG. 2, in the first direction 100, the first display screen 21, the first screen circuit board 221, the first screen device 222, the second screen device 322, the second screen circuit board 321 and the second display screen 31 are arranged in stack in sequence.

Continue to refer to FIG. 1, in some examples of the present application, the terminal device further includes a second main body 12, the second main body 12 and the first main body 11 are rotationally connected together, and the first display screen 21 extends to the second main body 12, so that, a part of the first display screen 21 is located on the second main body 12.

The terminal device in the example is the folding-type terminal device, and with relative rotation of the first main body 11 and the second main body 12, the folding-type terminal device may be in a folded form or an unfolded form. The first display screen 21 may extend from the first main body 11 to the second main body 12, so as to include two display regions corresponding to the first main body 11 and the second main body 12.

In some examples, the first display screen 21 may be a flexible display screen, the second display screen 31 may be a rigid display screen, or the second display screen 31 is formed by extending and bending the first display screen 21, at the moment, the first display screen 21 and the second display screen 31 are formed by the same integrally formed flexible display screen.

In some examples of the present application, the terminal device may be a terminal device of an inside folding type, at the moment, the first display screen 21 may be located on an inner side of the terminal device, and the second display screen 31 may be located on an outer side of the terminal device. It needs to be noted that "inner side" refers to a side which is relatively closed and concealed when the terminal device is in a folded form, and "outer side" refers to a side which relatively expands and is exposed when the terminal device is in a folded form.

Figure 3:
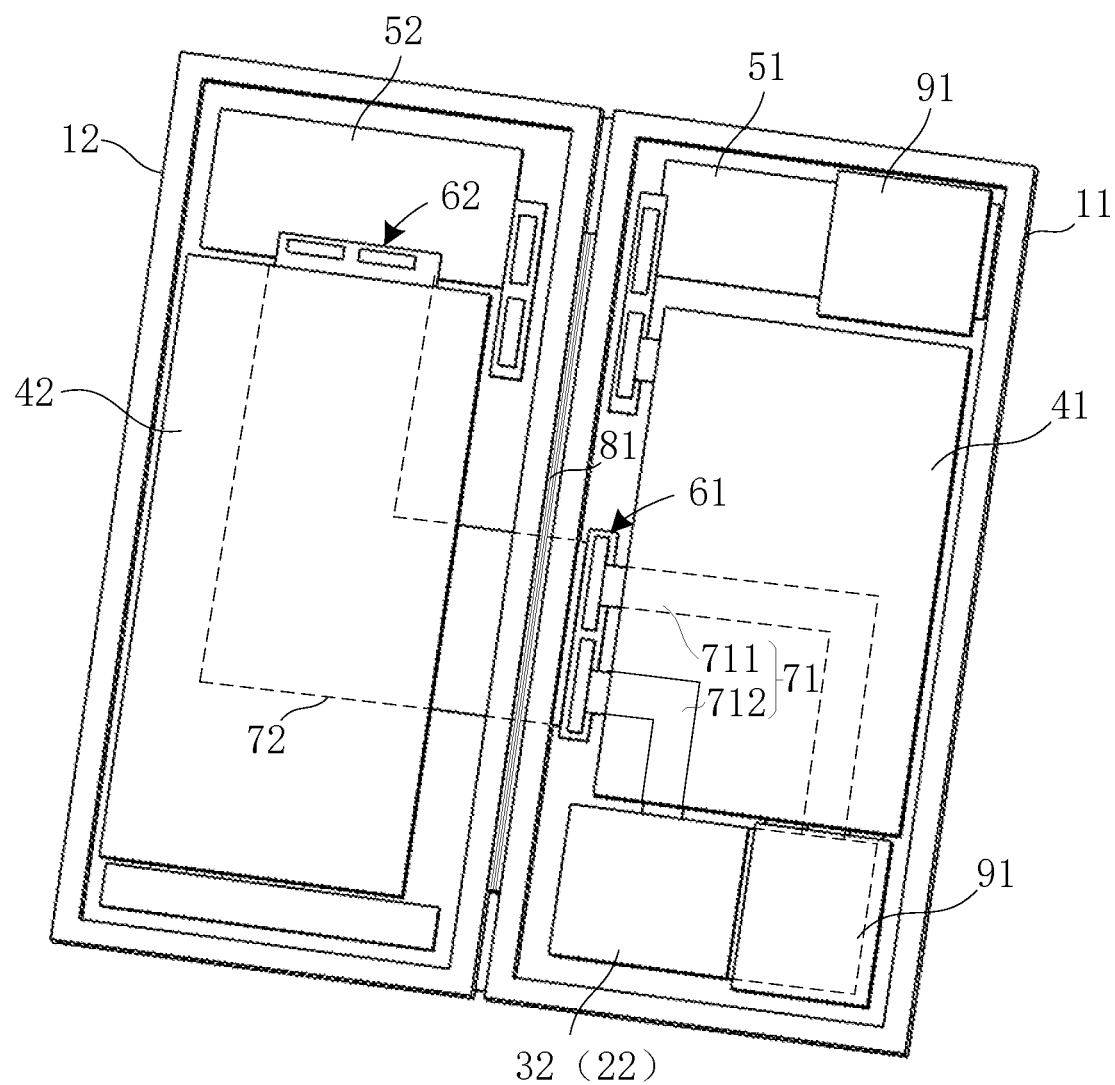
FIG. 3 is a schematic diagram of a second structure of a terminal device provided by an example of the present application.

As shown in FIG. 3, the terminal device may further include a first battery 41 and a first circuit board 51, the first circuit board 51 is used for circuit arrangement of at least one non-screen-realizing device, both the first battery 41 and the first circuit board 51 are located in the first main body 11, the first circuit board 51 is located on a first side of the first battery 41, the first screen assembly 22 and the second screen assembly 32 are located on a second side of the first battery 41, and the second side is opposite to the first side.

The first battery 41 is a battery arranged in the first main body 11 and configured to provide power for the first circuit board 51, the first screen assembly 22 and the second screen assembly 32. The first circuit board 51 may be, for example, an auxiliary control board and used for circuit arrangement of the non-screen-realizing device. The "non-screen-realizing device" refers to a device which is unrelated to the screen in function and realizes a function without depending on the screen, for example, a camera module, an ambient light sensor, a distance sensor, a speaker 91, an antenna module and other electronic devices, and the first circuit board 51 may be configured to mount and secure these non-screen-realizing devices not used for realizing screen functions and realize arrangement of these circuits of the non-screen-realizing devices.

Figure 4:
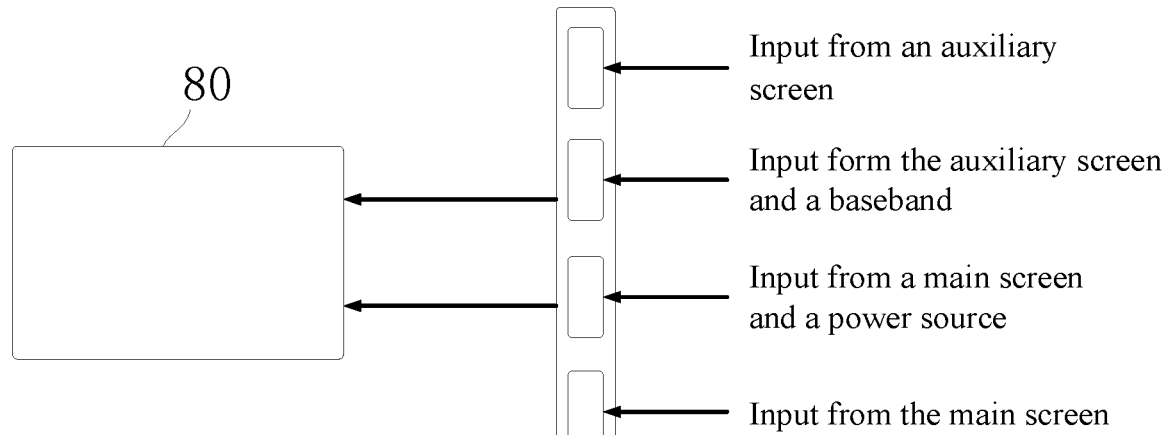
FIG. 4 is a schematic diagram of a part of a communication interconnection logic of a terminal device in the related art.

In the related art, the first circuit board 51 may also play a role of a transfer auxiliary board, a main body is arranged in the second main body 12, and the main body and the transfer auxiliary board are in signal connection. As shown in FIG. 4, in the related art, signals input from the auxiliary screen, a baseband, the main screen and a power source need to be transferred onto the transfer auxiliary board, and then the signals are forwarded to the main board through the transfer auxiliary board. However, in this design, taking signal input of the main screen and the auxiliary screen as an example, when the main screen and the auxiliary screen input a signal into the transfer auxiliary board, a set of connectors are usually arranged on the transfer auxiliary board and used for receiving a signal, when the transfer auxiliary board forwards the signal to the main board, a set of connectors need to be arranged on the transfer auxiliary board so as to send a signal, moreover, a set of connectors need to be arranged on the main board so as to receive the signal, and thus at least three sets of above connectors need to be arranged in the terminal device.

Figure 5:
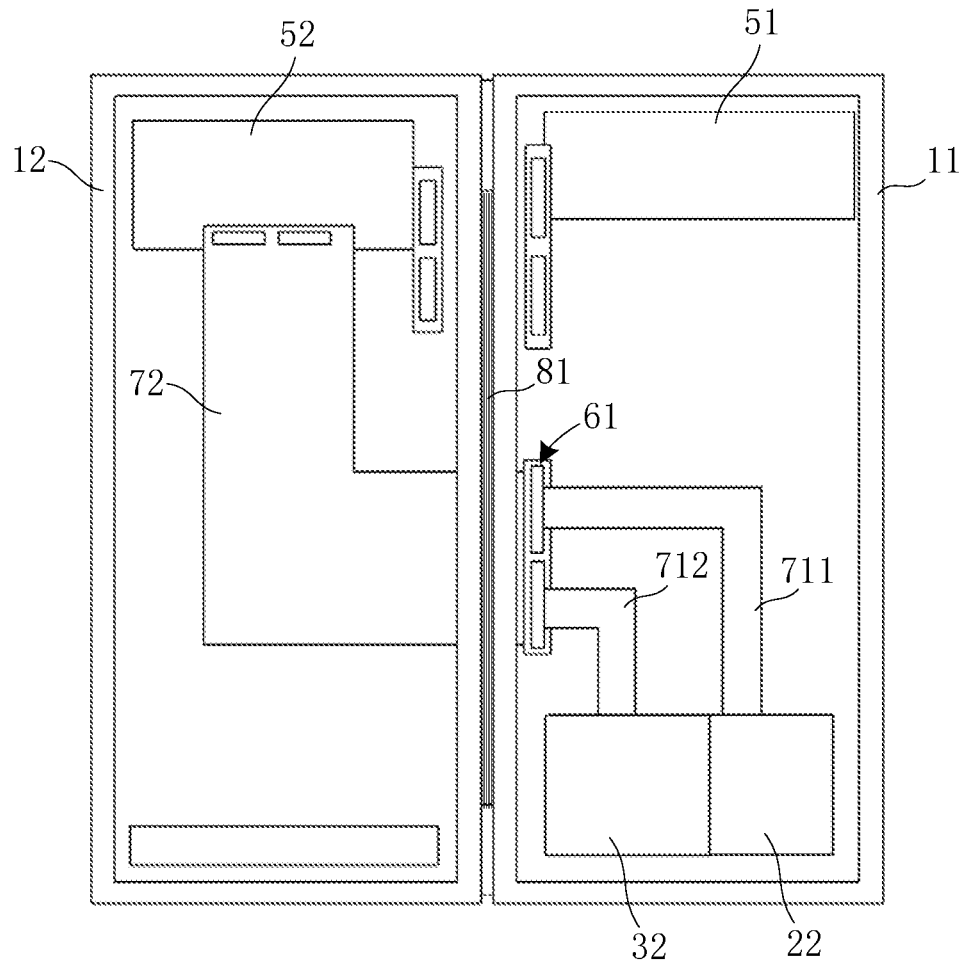
FIG. 5 is a schematic diagram of a third structure of a terminal device provided by an example of the present application.

However, in the example of the present application, as shown in FIG. 5, the terminal device includes a first connector assembly 61 and a first flexible board 71, and both the first connector assembly 61 and the first flexible board 71 are located in the first main body 11; the first connector assembly 61 is located on one side of the first battery 41 close to the second main body 12; and one end of the first flexible board 71 is connected with the first screen assembly 22 and the second screen assembly 32, and the other end of the first flexible board 17 is connected with the first connector assembly 61.

Thus, in the example of the present application, the first circuit board 51 is not configured to forward the signals, sent by the main screen, the auxiliary screen, the baseband and the power source, to the main board. The signals sent by the main screen, the auxiliary screen, the baseband and the power source are transferred to the first connector assembly 61 through the first flexible board 71 and then transferred to the main board through the first connector assembly 61.

The first connector assembly 61 is located on one side of the first battery 41 close to the second main body 12, here, "one side" may be the first side of the first battery 41, or may be the second side of the first battery 41, or may be other directions of the first battery 41, which is fine as long as it is relatively closer to the second main body 12.

It needs to be noted that the "flexible board" mentioned in the example of the present application is also called a flexible printer circuit (FPC), which is a printed circuit board having high reliability and excellent flexibility, made of polyimide or polyester film serving as a base material and having various advantages of high wiring density, light weight, small thickness, good bending, high flexibility and the like.

As shown in FIG. 3, in some examples of the present application, the first flexible board 71 includes a first secondary flexible board 711 and a second secondary flexible board 712; one end of the first secondary flexible board 711 is connected with the first screen assembly 22, and the other end of the first secondary flexible board 711 is connected with the first connector assembly 61; the second secondary flexible board 712 is located on one side of the first battery 41 close to the second display screen 31, one end of the second secondary flexible board 712 is connected with the second screen assembly 32, and the other end of the second secondary flexible board 712 is connected with the first connector assembly 61; and a gap remains between an orthographic projection of the first secondary flexible board 711 on the first main body 11 and an orthographic projection of the second secondary flexible board 712 on the first main body 11.

In the first direction, the gap remains between the orthographic projection of the first secondary flexible board 711 on the first main body 11 and the orthographic projection of the second secondary flexible board 712 on the first main body 11, that is, there is no overlapping region, so that an arrangement space of the first battery 41 in the first direction avoids being occupied.

For example, during assembling of the terminal device, the first display screen 21 needs to be mounted firstly, then the first battery 41 is mounted, finally, the second display screen 31 is mounted, so in the example of the present application, the second secondary flexible board 712 is arranged on one side of the first battery 41 close to the second display screen 31 so as to be convenient to assemble. For example, the first secondary flexible board 711 may be located on the side of the first battery 41 close to the second display screen 31, or the first secondary flexible board 711 may be located on one side of the first battery 41 away from the second display screen 31.

The terminal device further includes a second circuit board 52, a second connector assembly 62 and a second flexible board 72. The second circuit board 52 is located in the second main body 12 and used for circuit arrangement of at least one non-screen-realizing device. The second connector assembly 62 is located in the second main body 12 and connected with the second circuit board 52. One end of the second flexible board 72 is connected with the second connector assembly 62, and the other end of the second flexible board 72 is connected with the first connector assembly 61.

The second circuit board 52 may be, for example, a main control board, on which non-screen-realizing devices such as a system on chip (SOC), a read-only memory (ROM) and a random access memory (RAM) may be mounted and which is configured to realize circuit arrangement of these electronic devices mounted on the second circuit board 52.

The signals sent by the main screen, the auxiliary screen, the baseband and the power source, after being transferred to the first connector assembly 61, may continue being transferred through the second flexible board 72 connected to the first connector assembly 61 and are transferred to a corresponding data processing module on the main board through the second connector assembly 62.

Figure 6:
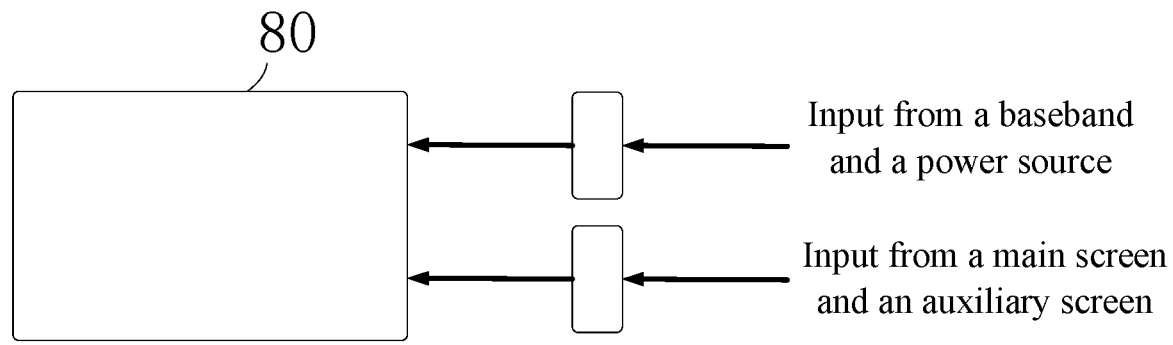
FIG. 6 is a schematic diagram of a communication interconnection logic of a terminal device provided by an example of the present application.

FIG. 6 is a schematic diagram of a communication interconnection logic of a terminal device provided by an example of the present application. Referring to FIG. 6, the signals input from the baseband, the power source, the main screen and the auxiliary screen may be sent to the second circuit board 52 directly through the connectors. Thus, in the example of the present application, transferring the signals, input from the baseband, the power source, the main screen and the auxiliary screen, to the main board may be realized by at least two sets of connectors, and compared with a signal transfer mode of forwarding through the transfer auxiliary board in the related art, at least one set of connectors is saved.

In some examples, each connector assembly may include two connectors. For example, the connector may adopt a board-to-board connector (also called a BTB connector), and the board-to-board connector has good transmission performance and has features of being light and thin, small in spacing, high in performance and the like.

As shown in FIG. 3, in the example of the present application, the terminal device further includes a spindle unit 81, the spindle unit 81 is connected with the first main body 11 and the second main body 12, so that the first main body 11 and the second main body 12 relatively rotate through the spindle unit 81; and the second flexible board 72 is located in the second main body 12, and one end of the second flexible board 72 strides over the spindle unit 81 to be connected with the first connector assembly 61.

Due to a flexible feature of the second flexible board 72, when the spindle unit 81 rotates and causes folding or unfolding of the terminal device, the second flexible board 72 can bend at different degrees along with a rotation angle of the spindle unit 81 without causing any damage.

For example, the second flexible board 72 may be connected to the second main body 12 and the spindle unit 81 in a gluing mode, or may be connected to the second main body 12 and the spindle unit 81 in a clamping limited mode.

As shown in FIG. 3, the terminal device provided by the example of the present application may further include a second battery 42, the second battery 42 is located in the second main body 12 and is adjacent to the second circuit board 52, and a part of the second flexible board 72 located in the second main body 12 is sandwiched between the second battery 42 and the second main body 12.

The second battery 42 can provide power for the second circuit board 52. For example, under the condition that a thickness of a battery keeps unchanged, the battery capacity is usually in direct proportion to an area, and the larger the area is, the higher the battery capacity becomes, the more the stored electric energy is. A residual arrangement space in the second main body 12 is larger, so a capacity of the second battery 42 is usually higher than a capacity of the first battery 41. For example, a thickness of the second battery 42 may be larger than a thickness of the first battery 41, so that the capacity of the second battery 42 is usually larger than the capacity of the first battery 41.

It needs to be noted that in the example of the present application, "sandwiched" is merely used to represent a position relation rather than a connection relation. In which, "A part of the second flexible board 72 located in the second main body 12 is sandwiched between the second battery 42 and the second main body 12" refers to that a position of the part of the second flexible board 72 located in the second main body 12 is located between the second battery 42 and the second main body 12, which does not limit the connection relation. For example, the second flexible board 72 may be connected with the second main body 12, or may be connected with the second battery 42, or may be not connected with the both. Besides, an aspect of a connection mode is not limited to that securing of the second flexible board 72 in the position is realized through interaction force between the second battery 42 and the second main body 12, for example, the second flexible board 72 may also be glued to the position.

Figure 7:
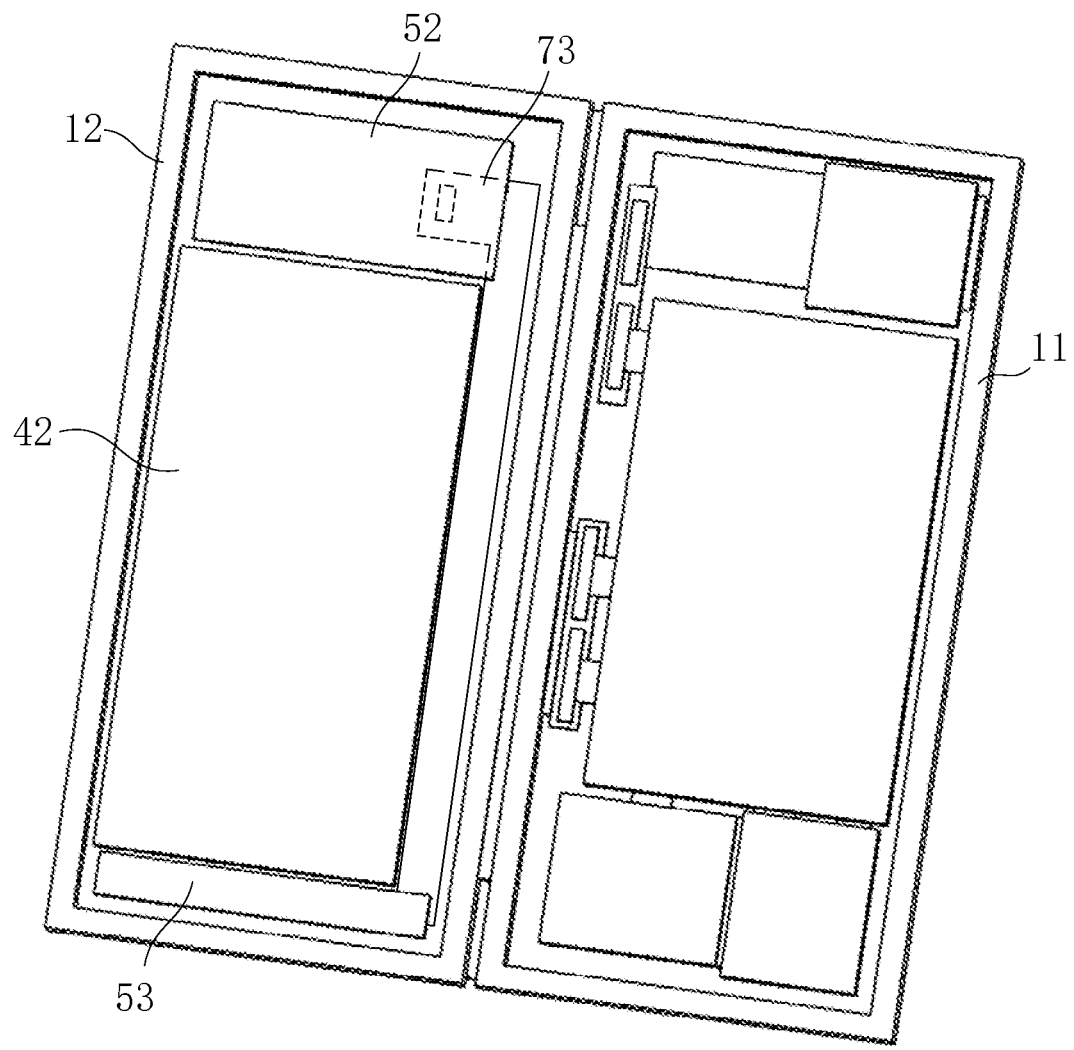
FIG. 7 is a schematic diagram of a fourth structure of a terminal device provided by an example of the present application.

As shown in FIG. 7, in the example of the present application, the terminal device further includes a third circuit board 53 and a third flexible board 73 located in the second main body 12, the third circuit board 53 is located on one side of the second battery 42 away from the second circuit board 52 and used for circuit arrangement of at least one non-screen-realizing device, the third flexible board 73 is located outside an orthographic projection of the second battery 42 on the second main body 12, one end of the third flexible board 73 is connected with the third circuit board 53, and the other end of the third flexible board 73 is connected with the second circuit board 52.

Non-screen-realizing devices not used for realizing screen functions such as a charging and data transmission port may be mounted on the third circuit board 53, for example, a USB Type-C port, an earbud jack and the like, and the third circuit board is configured to realize circuit arrangement of these electronic devices mounted on the third circuit board 53.

The third circuit board 53 may transfer the sent signals to the second circuit board 52 through the third flexible board 73. In order to avoid occupying the arrangement space of the second battery 42 during arrangement of the third flexible board 73 and affecting the capacity of the second battery 42, in the example of the present application, the third flexible board 73 may be arranged outside an orthographic projection region of the second battery 42 on the second main body 12, and a projection direction is in the first direction. In some examples, the third flexible board 73 may be arranged in an orthographic projection region of the spindle unit 81 on the second main body 12 in the first direction, and due to a flexible feature of the third flexible board 73, when the spindle unit 81 rotates and causes folding or unfolding of the terminal device, no damage to the third flexible board 73 is caused.

In the example of the present application, the terminal device further includes a backplane, the backplane is usually mounted on the second main body 12, and in the first direction, a part of the backplane and a part of the first display screen 21 extending to the second main body 12 are located on two opposite sides of the second main body 12 respectively. In response to determining that the terminal device is in the folded form, the backplane is opposite to the second display screen 31 in the first direction, and in response to determining that the terminal device is in the unfolded form, the backplane is adjacent to the second display screen 31. For example, the third flexible board 73 may be arranged on one side in the second main body 12 close to the backplane.

In the related art, speakers are further arranged in the second main body, the quantity of speakers is usually two, which is located on one side of the second battery close to the second circuit board and on one side of the second battery away from the second circuit board respectively. The speakers may occupy a part of space in the second main body, which affects expanding of the capacity of the second battery.

In the example of the present application, as shown in FIG. 3, the terminal device includes the speaker 91, the speaker 91 is mounted in the first main body 11 and connected to the first circuit board 51. The speaker 91 is located on the first side of the first battery 41, and/or the speaker 91 is located on the second side of the first battery 41.

For example, the terminal device shown in FIG. 3 includes the two speakers 91, one of the two speakers 91 is located on the first side of the first battery 41, and the other speaker is located on the second side of the first battery 41. The first screen assembly 22 and the second screen assembly 32 are stacked, so the saved tiled area can be used for arranging the speakers 91. After the speakers 91 are moved from the second main body 12 to the first main body 11 to be arranged, a space in the second main body 12 for originally arranging the speakers 91 may be saved and used for further expanding the capacity of the second battery 42, which is conducive to realizing a light and thin machine body. Besides, in other examples, the first screen assembly 22 and the second screen assembly 32 are stacked, so the saved tiled area may be further used for adding an arrangement space for the speakers 91, so that a sound effect of the speakers 91 is improved, and a better audio experience is achieved.

To sum up, according to the terminal device provided by the example of the present application, by stacking the first screen assembly 22 of the first display screen 21 and the screen assembly of the second display screen 31 in the thickness direction of the first main body 11, a transverse tiled area of the machine body can be saved, the saved space may be used for arranging the speakers 91, so that an audio effect is improved, or may be used for improving the battery capacity, so that the light and thin design of the machine body of the whole machine is realized.

Those skilled in the art will easily figure out other implementation solutions of the present application after considering the specification and practicing the present application disclosed herein. The present application intends to cover any transformation, application or adaptive change of the present application which conforms to a general principle of the present application and includes common general knowledge or conventional technical means which are not disclosed by the present application in the technical field. The specification and the examples are merely regarded as examples.

It should be understood that the present application is not limited to an accurate structure described above and shown in the drawings, and various modifications and changes can be made without departing from its scope. The scope of the present application is limited merely by appended claims.

Additional non-limiting examples of the disclosure include:

1. A terminal device, including a first main body 11, a first display screen 21, a first screen assembly 22, a second display screen 31 and a second screen assembly 32,
in a first direction, the first display screen 21 and the second display screen 31 are located on two opposite sides of the first main body 11; and
both the first screen assembly 22 and the second screen assembly 32 are located in the first main body 11, a target surface of the first screen assembly 22 and a target surface of the second screen assembly 32 are arranged in stack, the first screen assembly 22 is configured to realize a screen function of the first display screen 21, the second screen assembly 32 is configured to realize a screen function of the second display screen 31, and electronic devices are mounted on the target surfaces.

2. The terminal device according to example 1, the first screen assembly 22 includes a first screen circuit board 221 and a first screen device 222, and the first screen device 222 is connected to a device surface of the first screen circuit board 221;
the second screen assembly 32 includes a second screen circuit board 321 and a second screen device 322, and the second screen device 322 is connected to a device surface of the second screen circuit board 321; and
the device surface of the first screen circuit board 221 and the device surface of the second screen circuit board 321 are arranged in stack.

3. The terminal device according to example 2, in the first direction, the first display screen 21, the first screen circuit board 221, the first screen device 222, the second screen device 322, the second screen circuit board 321 and the second display screen 31 are arranged in stack in sequence.

4. The terminal device according to any one of examples 1-3, further including a second main body 12, the second main body 12 and the first main body 11 are rotationally connected together; and
the first display screen 21 extends to the second main body 12.

5. The terminal device according to example 4, including a first battery 41 and a first circuit board 51, the first circuit board 51 is used for circuit arrangement of at least one non-screen-realizing device; and
both the first battery 41 and the first circuit board 51 are located in the first main body 11, the first circuit board 51 is located on a first side of the first battery 41, the first screen assembly 22 and the second screen assembly 32 are located on a second side of the first battery 41, and the second side is opposite to the first side.

6. The terminal device according to example 5, including a first connector assembly 61 and a first flexible board 71, and both the first connector assembly 61 and the first flexible board 71 are located in the first main body 11;

the first connector assembly 61 is located on one side of the first battery 41 close to the second main body 12; and
one end of the first flexible board 71 is connected with the first screen assembly 22 and the second screen assembly 32, and the other end of the first flexible board is connected with the first connector assembly 61.

7. The terminal device according to example 6, the first flexible board 71 includes a first secondary flexible board 711 and a second secondary flexible board 712;
one end of the first secondary flexible board 711 is connected with the first screen assembly 22, and the other end of the first secondary flexible board is connected with the first connector assembly 61;
the second secondary flexible board 712 is located on one side of the first battery 41 close to the second display screen 31, one end of the second secondary flexible board 712 is connected with the second screen assembly 32, and the other end of the second secondary flexible board is connected with the first connector assembly 61; and
a gap remains between an orthographic projection of the first secondary flexible board 711 on the first main body 11 and an orthographic projection of the second secondary flexible board 712 on the first main body 11.

8. The terminal device according to example 6 or 7, including a second circuit board 52, a second connector assembly 62 and a second flexible board 72,
the second circuit board 52 is located in the second main body 12 and used for circuit arrangement of at least one non-screen-realizing device;
the second connector assembly 62 is located in the second main body 12 and connected with the second circuit board 52; and
one end of the second flexible board 72 is connected with the second connector assembly 62, and the other end of the second flexible board is connected with the first connector assembly 61.

9. The terminal device according to example 8, including a spindle unit 81, the spindle unit 81 is connected with the first main body 11 and the second main body 12, such that the first main body 11 and the second main body 12 rotate relatively through the spindle unit 81; and
the second flexible board 72 is located in the second main body 12, and one end of the second flexible board 72 strides over the spindle unit 81 to be connected with the first connector assembly 61.

10. The terminal device according to example 9, including a second battery 42, the second battery 42 is located in the second main body 12 and is adjacent to the second circuit board 52; and
a part of the second flexible board 72 located in the second main body 12 is sandwiched between the second battery 42 and the second main body 12.

11. The terminal device according to example 10, including a third circuit board 53 and a third flexible board 73 located in the second main body 12,
the third circuit board 53 is located on one side of the second battery 42 away from the second circuit board 52 and used for circuit arrangement of at least one non-screen-realizing device; and
the third flexible board 73 is located outside an orthographic projection of the second battery 42 on the second main body 12, one end of the third flexible board 73 is connected with the third circuit board 53, and the other end of the third flexible board is connected with the second circuit board 52.

12. The terminal device according to example 11, the third flexible board is arranged in an orthographic projection region of the spindle unit on the second main body in the first direction.

13. The terminal device according to any one of examples 5-12, including a speaker 91, the speaker 91 is mounted in the first main body 11 and connected with the first circuit board 51; and the speaker 91 is located on the first side of the first battery 41, and/or the speaker 91 is located on the second side of the first battery 41.

14. The terminal device according to any one of examples 4-13, the first display screen 21 is a flexible display screen; and the second display screen 31 is a rigid display screen, or the second display screen 31 is formed by extending and bending the first display screen 21.

The invention claimed is:

1. A terminal device, comprising a first main body, a first display screen, a first screen assembly, a second display screen and a second screen assembly, wherein in a first direction, the first display screen and the second display screen are located on two opposite sides of the first main body; and both the first screen assembly and the second screen assembly are located in the first main body, a target surface of the first screen assembly and a target surface of the second screen assembly are arranged in stack, the first screen assembly is configured to realize a screen function of the first display screen, the second screen assembly is configured to realize a screen function of the second display screen, and electronic devices are on the first and second target surfaces;

the terminal device further comprises a second main body, wherein the second main body and the first main body are rotationally connected together;

the terminal device further comprises a first battery, wherein the first battery is located in the first main body; and the terminal device further comprises a first connector assembly and a first flexible board, wherein both the first connector assembly and the first flexible board are located in the first main body;

the first connector assembly is located on one side of the first battery close to the second main body; and one end of the first flexible board is connected with the first screen assembly and the second screen assembly, and the other end of the first flexible board is connected with the first connector assembly.

2. The terminal device according to claim 1, wherein the first screen assembly comprises a first screen circuit board and a first screen device, and the first screen device is connected to a device surface of the first screen circuit board;

the second screen assembly comprises a second screen circuit board and a second screen device, and the second screen device is connected to a device surface of the second screen circuit board; and the device surface of the first screen circuit board and the device surface of the second screen circuit board are arranged in stack.

3. The terminal device according to claim 2, wherein in the first direction, the first display screen, the first screen circuit board, the first screen device, the second screen device, the second screen circuit board and the second display screen are arranged in stack in sequence.

4. The terminal device according to claim 1, wherein the first display screen extends to the second main body.

5. The terminal device according to claim 4, comprising a first circuit board, wherein the first circuit board is used for circuit arrangement of at least one non-screen-realizing device; and the first circuit board is located in the first main body, the first circuit board is located on a first side of the first battery, the first screen assembly and the second screen assembly are located on a second side of the first battery, and the second side is opposite to the first side.

6. The terminal device according to claim 1, wherein the first flexible board comprises a first secondary flexible board and a second secondary flexible board;

one end of the first secondary flexible board is connected with the first screen assembly, and the other end of the first secondary flexible board is connected with the first connector assembly;

the second secondary flexible board is located on one side of the first battery close to the second display screen, one end of the second secondary flexible board is connected with the second screen assembly, and the other end of the second secondary flexible board is connected with the first connector assembly; and a gap remains between an orthographic projection of the first secondary flexible board on the first main body and an orthographic projection of the second secondary flexible board on the first main body.

7. The terminal device according to claim 1, comprising a second circuit board, a second connector assembly and a second flexible board, wherein the second circuit board is located in the second main body and used for circuit arrangement of at least one device that is not a screen device;

the second connector assembly is located in the second main body and connected with the second circuit board; and one end of the second flexible board is connected with the second connector assembly, and the other end of the second flexible board is connected with the first connector assembly.

8. The terminal device according to claim 7, comprising a spindle unit, wherein the spindle unit is connected with the first main body and the second main body, such that the first main body and the second main body rotate relatively through the spindle unit; and the second flexible board is located in the second main body, and one end of the second flexible board strides over the spindle unit to be connected with the first connector assembly.

9. The terminal device according to claim 8, comprising a second battery, wherein the second battery is located in the second main body and is adjacent to the second circuit board; and a part of the second flexible board located in the second main body is sandwiched between the second battery and the second main body.

10. The terminal device according to claim 9, comprising a third circuit board and a third flexible board located in the second main body, wherein the third circuit board is located on one side of the second battery away from the second circuit board and used for circuit arrangement of at least one non-screen-realizing device; and the third flexible board is located outside an orthographic projection of the second battery on the second main body, one end of the third flexible board is connected with the third circuit board, and the other end of the third flexible board is connected with the second circuit board.

11. The terminal device according to claim 6, comprising a second circuit board, a second connector assembly and a second flexible board, wherein
the second circuit board is located in the second main body and used for circuit arrangement of at least one device that is not a screen device;
the second connector assembly is located in the second main body and connected with the second circuit board; and
one end of the second flexible board is connected with the second connector assembly, and the other end of the second flexible board is connected with the first connector assembly.

12. The terminal device according to claim 11, comprising a spindle unit, wherein the spindle unit is connected with the first main body and the second main body, such that the first main body and the second main body rotate relatively through the spindle unit; and
the second flexible board is located in the second main body, and one end of the second flexible board strides over the spindle unit to be connected with the first connector assembly.

13. The terminal device according to claim 12, comprising a second battery, wherein the second battery is located in the second main body and is adjacent to the second circuit board; and
a part of the second flexible board located in the second main body is sandwiched between the second battery and the second main body.

14. The terminal device according to claim 13, comprising a third circuit board and a third flexible board located in the second main body, wherein
the third circuit board is located on one side of the second battery away from the second circuit board and used for circuit arrangement of at least one non-screen-realizing device; and
the third flexible board is located outside an orthographic projection of the second battery on the second main body, one end of the third flexible board is connected with the third circuit board, and the other end of the third flexible board is connected with the second circuit board.

15. The terminal device according to claim 10, wherein the third flexible board is arranged in an orthographic projection region of the spindle unit on the second main body in the first direction.

16. The terminal device according to claim 5, comprising a speaker, wherein the speaker is mounted in the first main body and connected with the first circuit board; and
the speaker is located on the first side of the first battery.

17. The terminal device according to claim 5, comprising a speaker, wherein the speaker is mounted in the first main body and connected with the first circuit board; and
the speaker is located on the second side of the first battery.

18. The terminal device according to claim 4, wherein the first display screen is a flexible display screen; and
the second display screen is a rigid display screen.

19. The terminal device according to claim 4, wherein the first display screen is a flexible display screen; and
the second display screen is formed by extending and bending the first display screen.

* * * * *